US012756291B2

(12) United States Patent
Shin et al.

(10) Patent No.: US 12,756,291 B2
(45) Date of Patent: Oct. 6, 2026

(54) CONFIGURABLE CONTROL FOR TWO-LEVEL AND THREE-LEVEL BUCK CONVERTERS

(71) Applicant: Renesas Electronics America Inc., Milpitas, CA (US)

(72) Inventors: Kee Ho Shin, Cary, NC (US); Phillip Marc Johnson, Durham, NC (US); Sungkeun Lim, Apex, NC (US); Yen-Mo Chen, Morrisville, NC (US)

(73) Assignee: Renesas Electronics America Inc., San Jose, CA (US)

( * ) Notice: Subject to any disclaimer, the term of this patent is extended or adjusted under 35 U.S.C. 154(b) by 398 days.

(21) Appl. No.: 18/500,602

(22) Filed: Nov. 2, 2023

(65) Prior Publication Data

US 2025/0149970 A1 May 8, 2025

(51) Int. Cl.

| | |
|---|---|
| ***H02M 1/00*** | (2007.01) |
| ***H02M 3/00*** | (2006.01) |
| ***H02M 3/06*** | (2006.01) |
| ***H02M 3/07*** | (2006.01) |
| ***H02M 3/156*** | (2006.01) |
| ***H02M 3/158*** | (2006.01) |
| *H02M 7/483* | (2007.01) |

(52) U.S. Cl.

CPC ....... *H02M 1/0095* (2021.05); *H02M 1/0025* (2021.05); *H02M 3/003* (2021.05); *H02M 3/06* (2013.01); *H02M 3/072* (2021.05); *H02M 3/1566* (2021.05); *H02M 3/158* (2013.01); *H02M 7/4837* (2021.05)

(58) Field of Classification Search

CPC ............. H02M 1/0003; H02M 1/0009; H02M 1/0012; H02M 1/0025; H02M 1/0032; H02M 1/0054; H02M 1/0095; H02M 1/08; H02M 3/003; H02M 3/06; H02M 3/07; H02M 3/072; H02M 3/156; H02M 3/1566; H02M 3/157; H02M 3/158; H02M 7/483; H02M 7/4837

See application file for complete search history.

(56) References Cited

U.S. PATENT DOCUMENTS

| | | | | |
|---|---|---|---|---|
| 9,692,299 | B2 * | 6/2017 | Kitagaki ............ | G01R 31/2841 |
| 2013/0245854 | A1 * | 9/2013 | Rinne ................... | H02M 3/156 700/297 |
| 2020/0195133 | A1 * | 6/2020 | Bonnano ............... | H02M 3/158 |
| 2025/0030339 | A1 * | 1/2025 | Wu ...................... | H02M 7/4837 |
| 2025/0141366 | A1 * | 5/2025 | Abdelhamid ....... | H02M 7/5395 |

FOREIGN PATENT DOCUMENTS

| | | | | |
|---|---|---|---|---|
| KR | 20220079407 A | * | 6/2022 | .............. H02M 1/32 |

* cited by examiner

*Primary Examiner* — Thienvu V Tran
*Assistant Examiner* — Shahzeb K Ahmad
(74) *Attorney, Agent, or Firm* — SCULLY, SCOTT, MURPHY & PRESSER, P.C.

(57) ABSTRACT

Apparatuses, devices, and methods for operating a voltage converter are described. A semiconductor device can include a switching circuit and a controller. The switching circuit can include a plurality of switching elements. The controller can determine an operation mode of the switching circuit. In response to the operation mode indicating a two-level operation mode, the controller can program the switching circuit to operate as a two-level voltage converter. In response to the operation mode indicating a three-level operation mode, the controller can program the switching circuit to operate as a three-level converter.

17 Claims, 5 Drawing Sheets

CONFIGURABLE CONTROL FOR TWO-LEVEL AND THREE-LEVEL BUCK CONVERTERS

BACKGROUND

The present disclosure relates in general to semiconductor devices. More specifically, the present disclosure relates to topologies and methods for a controller that can be programmed to operate a voltage converter circuit as a two-level buck converter or a three-level buck converter.

Voltage converters, such as buck converters and boost converters, can be used for converting an input voltage to an output voltage having a different voltage level. A buck converter, or step-down converter, can be used in applications where there is a need to decrease a direct current (DC) voltage. The buck converter can receive an input voltage and provide a stepped-down output voltage. A boost converter, or step-up converter, can be used in applications where there is a need to increase a DC voltage. The boost converter can receive an input voltage and provide a stepped-up output voltage. A voltage converter can include multiple switches at an input of the voltage converter, where the switches can be turned on and off by a pulse width modulated (PWM) control signal. A duty cycle of the PWM control signal can determine an output voltage of the voltage converter. As the switches turn on and off, they modulate a DC input voltage and the modulated voltage can be provided to an inductor. The inductor can be connected to a capacitor and the modulated voltage can be a time-varying voltage that causes the inductor to create a time-varying current. The interaction of the inductor and capacitor with the time-varying voltage and current can produce a nearly constant output voltage that has a different DC level than the input voltage.

A voltage converter with two switches can switch the inductor between two voltages—the input voltage and ground. A multi-level voltage converter can include more than two switches and can switch the inductor among more than two voltages—the input voltage, at least one intermediate voltage between the input voltage and ground, and ground. For example, a three-level voltage converter can include four switches and can switch the inductor among three voltages—the input voltage, a mid-voltage equivalent to half the input voltage, and ground. Multi-level voltage converters include at least one flying capacitor that is switched between two states—a charging state and a discharging state.

SUMMARY

In one embodiment, a semiconductor device is generally described. The semiconductor device can include a switching circuit and a controller. The controller can be configured to determine an operation mode of the switching circuit. The controller can be further configured to, in response to the operation mode indicating a two-level operation mode, program the switching circuit to operate as a two-level voltage converter. The controller can be further configured to, in response to the operation mode indicating a three-level operation mode, program the switching circuit to operate as a three-level voltage converter.

In one embodiment, a semiconductor device is generally described. The semiconductor device can include a modulator configured to generate a plurality of control signals to operate a switching circuit. The semiconductor device can further include a flying capacitor balancer configured to control a flying capacitor voltage of a flying capacitor connected to the switching circuit. The semiconductor device can further include a controller configured to determine an operation mode of the switching circuit. The controller can be further configured to, in response to the operation mode indicating a two-level operation mode, program the modulator to generate a first set of control signals for operating a switching circuit as a two-level voltage converter. The controller can be further configured to, in response to the operation mode indicating a three-level operation mode, connect the flying capacitor balancer to the modulator to control the flying capacitor voltage of the flying capacitor and program the modulator to generate a second set of control signals for operating the switching circuit as a three-level voltage converter.

In one embodiment, a method for configuring a voltage converter is generally described. The method can include determining an operation mode of the switching circuit. The method can further include, in response to the operation mode indicating a two-level operation mode, programming a switching circuit to operate as a two-level voltage converter. The method can further include, in response to the operation mode indicating a three-level operation mode, programming the switching circuit to operate as a three-level converter.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1A:
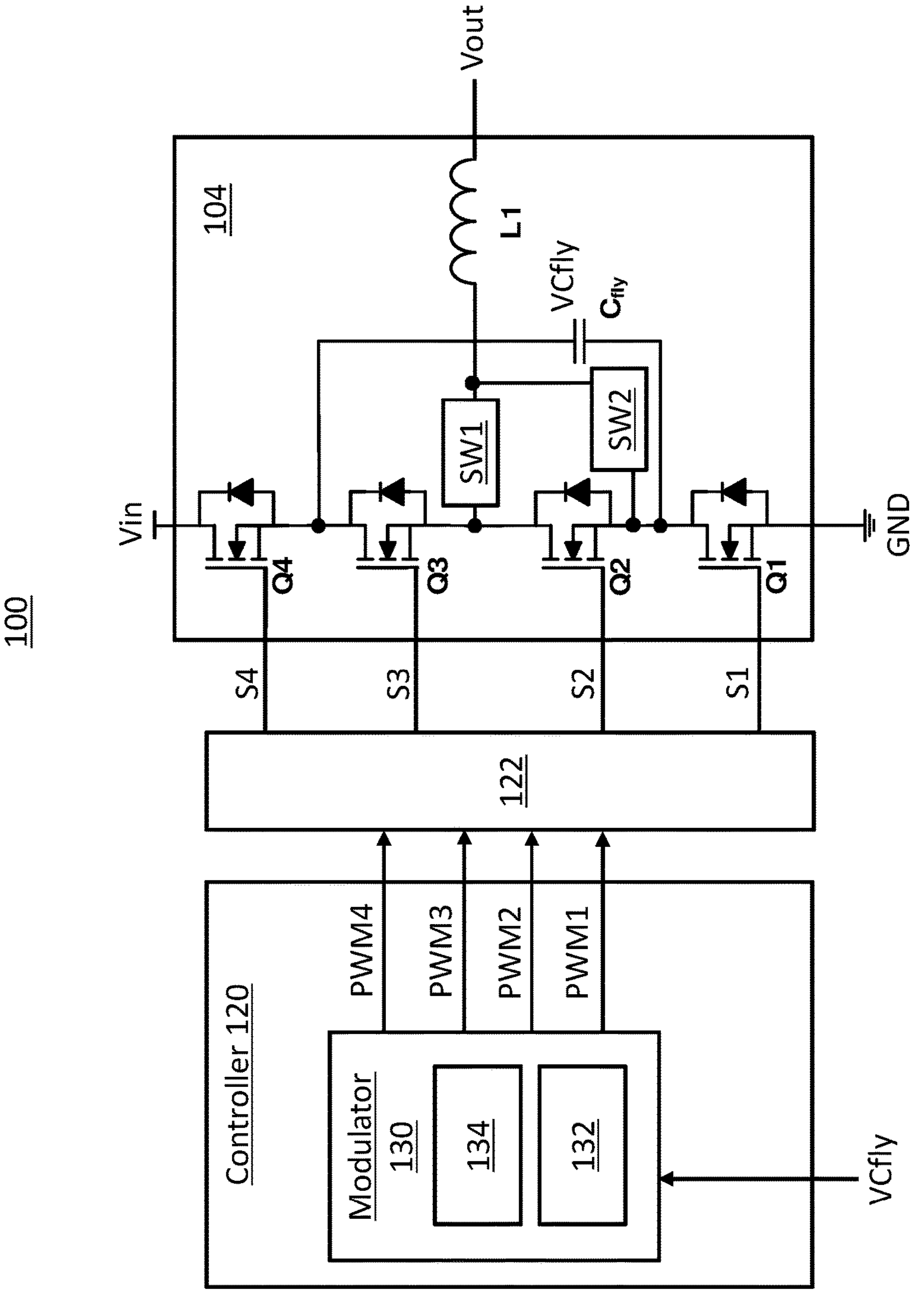
FIG. 1A is an example diagram of a semiconductor device that can implement configurable control for two-level and three-level buck converters in one embodiment.

FIG. 1A is an example diagram of a semiconductor device that can implement configurable control for two-level and three-level buck converters in one embodiment. A system 100 is shown in FIG. 1A. System 100 can include at least a switching circuit 104, a controller 120 and a gate driver 122. System 100 can be implemented in a semiconductor package including semiconductor devices. Controller 120 can be, for example, a microcontroller including processing hardware and memory devices. Controller 120 can include a modulator 130 configured to generate one or more pulse width modulation (PWM) signals PWM1, PWM2, PWM3, PWM4.

Switching circuit 104 can include four transistors Q1, Q2, Q3, Q4, an inductor L1, and a flying capacitor Cfly. Transistors Q1, Q2, Q3, Q4 can be metal-oxide-semiconductor field-effect transistors (MOSFETs), gallium nitride (GaN) transistors, or similar. In one embodiment, switching circuit 104 can implement more than one multi-level buck converter (e.g., step-down DC-DC voltage converter) depending on a plurality of switches and various internal signals and components in switching circuit 104, controller 120 and/or modulator 130.

Controller 120 can include a modulator 130 configured to generate PWM signals PWM1. PWM2, PWM3, PWM4. Controller 120 can be configured to provide PWM signals PWM1. PWM2, PWM3, PWM4 to gate driver 122. Gate driver 122 can be configured to generate a plurality of drive signals S1, S2, S3, S4 using PWM1, PWM2, PWM3, PWM4, respectively. Drive signals S1, S2, S3, S4 can be voltage signals representing voltages at voltage levels that can switch on or switch off transistors Q1,Q2,Q3,Q4. Gate driver 122 can apply driver signals S1, S2, S3, S4 on the gates of transistors Q1, Q2, Q3, Q4 to drive transistors Q1, Q2, Q3, Q4, respectively.

In one embodiment shown in FIG. 1A, switching circuit 104 can further include switching elements or switches labeled as SW1 and SW2. Controller 120 can be configured to control switches SW1, SW2 to implement switching circuit 104 as a two-level buck converter or three-level buck converter. Controller 120 can turn on switch SW1 and turn off switch SW2 to implement switching circuit 104 as a three-level buck converter, such that a switch node between transistors Q2, Q3 can be connected to inductor L. Controller 120 can turn off switch SW1 and turn on switch SW2 to implement switching circuit 104 as a two-level buck converter, such that a switch node between transistors Q1, Q2 can be connected to inductor L. Further, when switching circuit 104 is implemented as a two-level buck converter, PWM signals PWM3 and PWM4 can be a constant HIGH voltage that can maintain transistors Q3, Q4 in an ON state (e.g., Q3 and Q4 will not be switching) such that a conductive path can be formed between Vin and transistor Q2. In another embodiment, when switching circuit 104 is implemented as a two-level buck converter, Vin can be directly connected to the drain of Q2 and the gates of transistors Q3, Q4 can be left floating.

In one embodiment, when switching circuit 104 implements a two-level buck converter, transistors Q1, Q2 can be switched at different timings to generate a desired voltage level and output the desired voltage level as output voltage Vout. Voltage at a switch node between inner transistors Q1, Q2 can alternate between Vin and ground (GND) or 0V.

In one embodiment, when switching circuit 104 implements a three-level buck converter, transistors Q1, Q2, Q3, Q4 can be switched at different timings to generate a desired voltage level and output the desired voltage level as output voltage Vout. The timing and duty cycle of drive signals S1, S2, S3, S4 can control and maintain a flying capacitor voltage VCfly (e.g., a voltage across flying capacitor Cfly) at half the input voltage Vin, such as Vin/2. By maintaining the flying capacitor voltage at Vin/2, the voltage at a switch node between inner transistors Q2, Q3 can alternate between Vin, Vin/2, and ground (GND) or 0V.

In conventional systems, to configure a voltage converter to operate as a two-level buck converter or a three-level buck converter, separate controllers are needed to control and operate the voltage converter in the two different buck converter modes. For example, conventional systems use a controller capable of generating PWM signals to operate the voltage converter as a two-level buck converter, and use a different controller capable of generating PWM signals to operate the voltage converter as a three-level buck converter. Note that different controllers are being used in such conventional systems since conventional controllers are typically not designed to control both two-level and three-level buck converters. For example, a controller for controlling two-level buck converters may not be capable to control the flying capacitor voltage that can be crucial to operations of a three-level buck converter. A conventional controller can typically control only one of a two-level buck converter and a three-level buck converter.

To construct an integrated circuit (IC) that can be configurable to implement a two-level buck converter or a three-level buck converter, modulator 130 of controller 120 can be configured or modified to allow controller 120 to operate both two-level buck converters and three-level buck converters with flying capacitor voltage control. In an aspect, modulator 130 can be a modulator with relatively fast transient response, variable switching frequency during load transients, and improved light load efficiency due to its ability to automatically change switching frequency. Modulator 130 can be configured to simultaneously control the switching frequency and duty cycle of PWM signals generated by modulator 130 in response to input voltage and output load transients. To simultaneously control the switching frequency and duty cycle of PWM signals, modulator 130 can include a voltage window generator 132 for controlling on and off times and switching frequencies of the PWM signals.

By way of example, modulator 130 can synthesize an alternating current (AC) signal that represents an output inductor ripple current at inductor L1 and use the voltage window generator 132 on the AC signal. Modulator 130 can turn off a PWM control signal when the AC signal reaches an upper bound of a voltage window set by voltage window comparator 132, and can turn on the PWM control signal when the AC signal reaches a lower bound of the voltage window. The voltage window can be dependent on a compensation signal, such as a signal labeled as COMP in FIG. 1B and FIG. 1C. Due to the AC signal being a synthesized signal, AC signal can have relatively large amplitude and can be noise-free. Thus, modulator 130 can operate with lower phase jitter than conventional hysteretic mode modulators. Further, when the compensation signal rises during dynamic response, modulator 130 can change switching frequency by temporarily turning on the PWM signals earlier and more frequently, which allows for higher control loop bandwidth than conventional fixed frequency PWM modulators at the same steady state switching frequency.

Figure 1B:
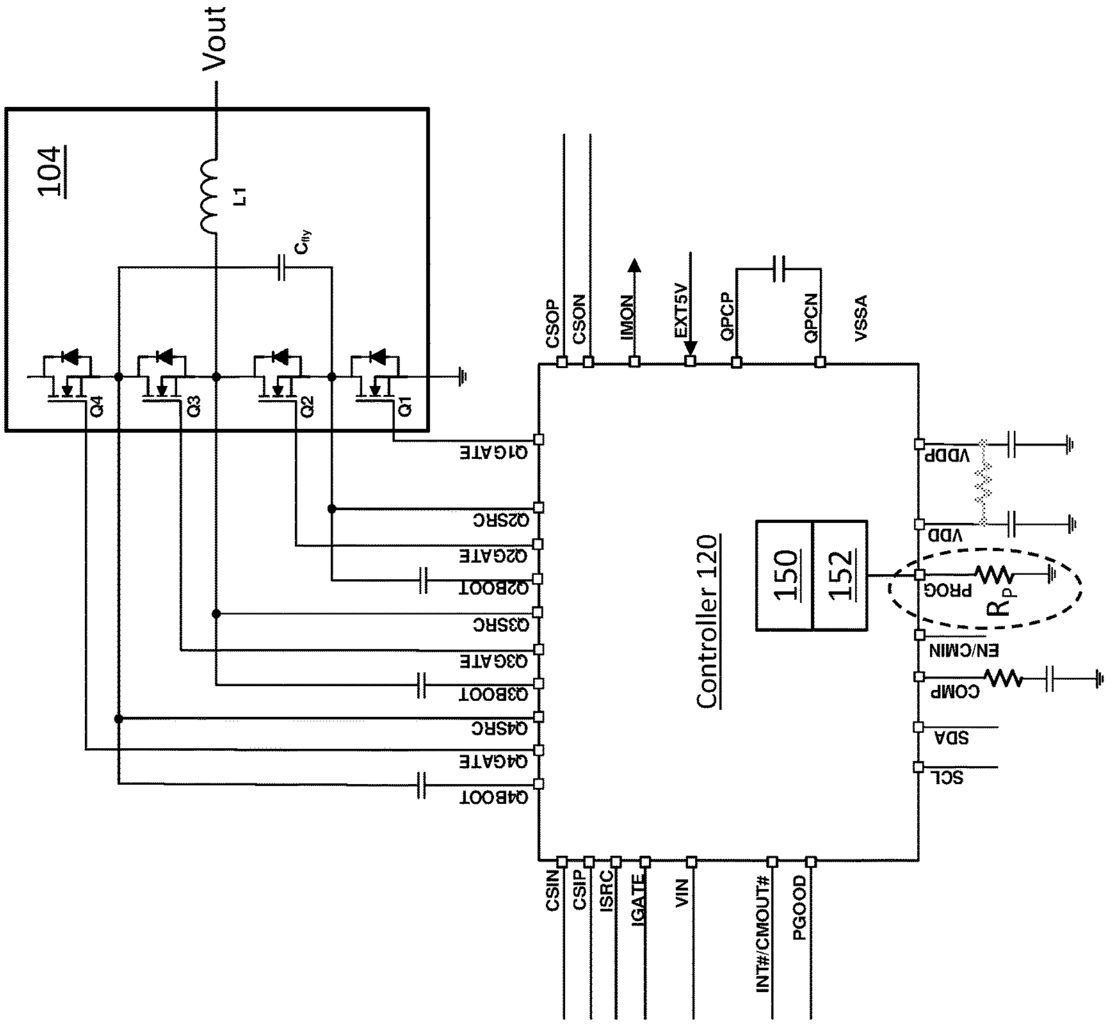
FIG. 1B is an example integrated circuit that can implement configurable control for two-level and three-level buck converters in one embodiment.
Figure 1C:
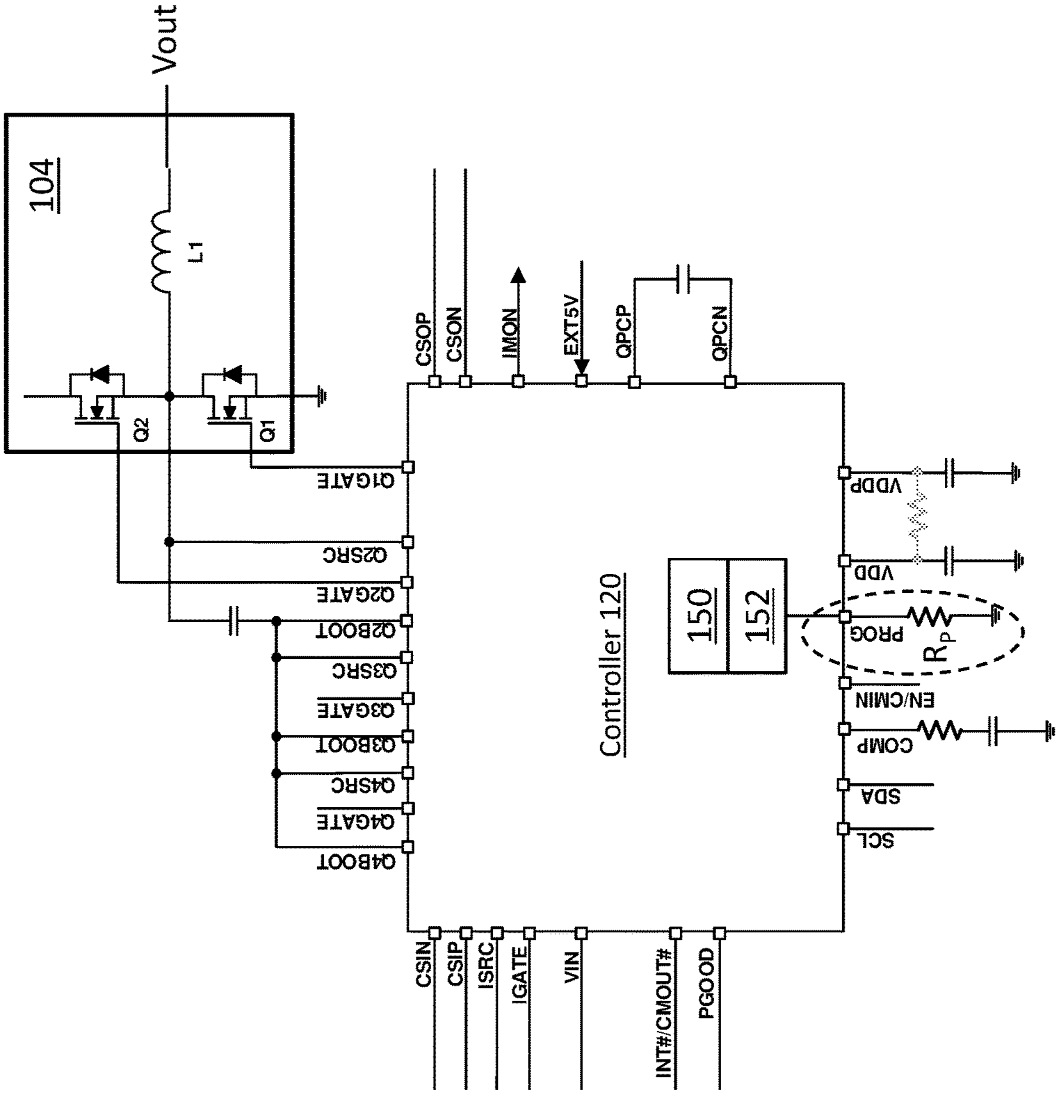
FIG. 1C is an example diagram of another integrated circuit that can implement configurable control for two-level and three-level buck converters in one embodiment.

To configure controller 120 to have the capability to operate both two-level and three-level buck converters, modulator 130 can include a Cfly balancer 134 that can be a circuit configured to generate an offset voltage. Cfly balancer 134 can provide the offset voltage to the voltage window generator 132 to modify the voltage window. The modified voltage window can allow modulator 130 to control VCfly in order to maintain VCfly at Vin/2. Further, Cfly balancer 134 can be connected or disconnected from modulator 130 depending on a programming pin on controller 120 that indicates an operation mode of switching circuit 104. In one embodiment, controller 120, flying capacitor balancer 134 and voltage window 132 can be monolithically integrated in a single die. Referring to FIG. 1B and FIG. 1C, a programming pin labeled as PROG can be connected to a programming resistor $R_P$. Controller 120 can be configured to measure $R_P$ by reading the programming pin PROG, and based on $R_P$, determine whether to operate switching circuit 104 as a two-level buck converter or a three-level buck converter. By way of example, a first register 150 in controller 120 can store a first value of $R_P$ corresponding to operating switching circuit 104 as a two-level buck converter, and a second register 152 in controller 120 can store a second value of $R_P$ corresponding to operating switching circuit 104 as a three-level buck converter. In response to reading $R_P$ from the programming pin PROG, controller 120 can compare the read $R_P$ with first register 150 and/or second register 152. If the read $R_P$ is approximately identical to the first value stored in first register 150, controller 120 can program or configure switching circuit 104 as a two-level buck converter and disconnect Cfly balancer 134 from modulator 130. If the read $R_P$ is approximately identical to the second value stored in second register 152, controller 120 can program or configure switching circuit 104 as a three-level buck converter and connect Cfly balancer 134 to modulator 130.

Further, in one embodiment, switching circuit 104 can be configured to operate as a two-level buck converter or a three-level buck converter during a design phase of a printed circuit board (PCB) layout. Thus, the resistance $R_P$ at programming pin PROG can be fixed and may not change once switching circuit 104 is programmed as a two-level buck converter or a three-level buck converter. In an example embodiment shown in FIG. 1B, switching circuit 104 is configured to operate as a three-level buck converter. In an example embodiment shown in FIG. 1C, switching circuit 104 is configured to operate as two-level buck converter.

Figure 2:
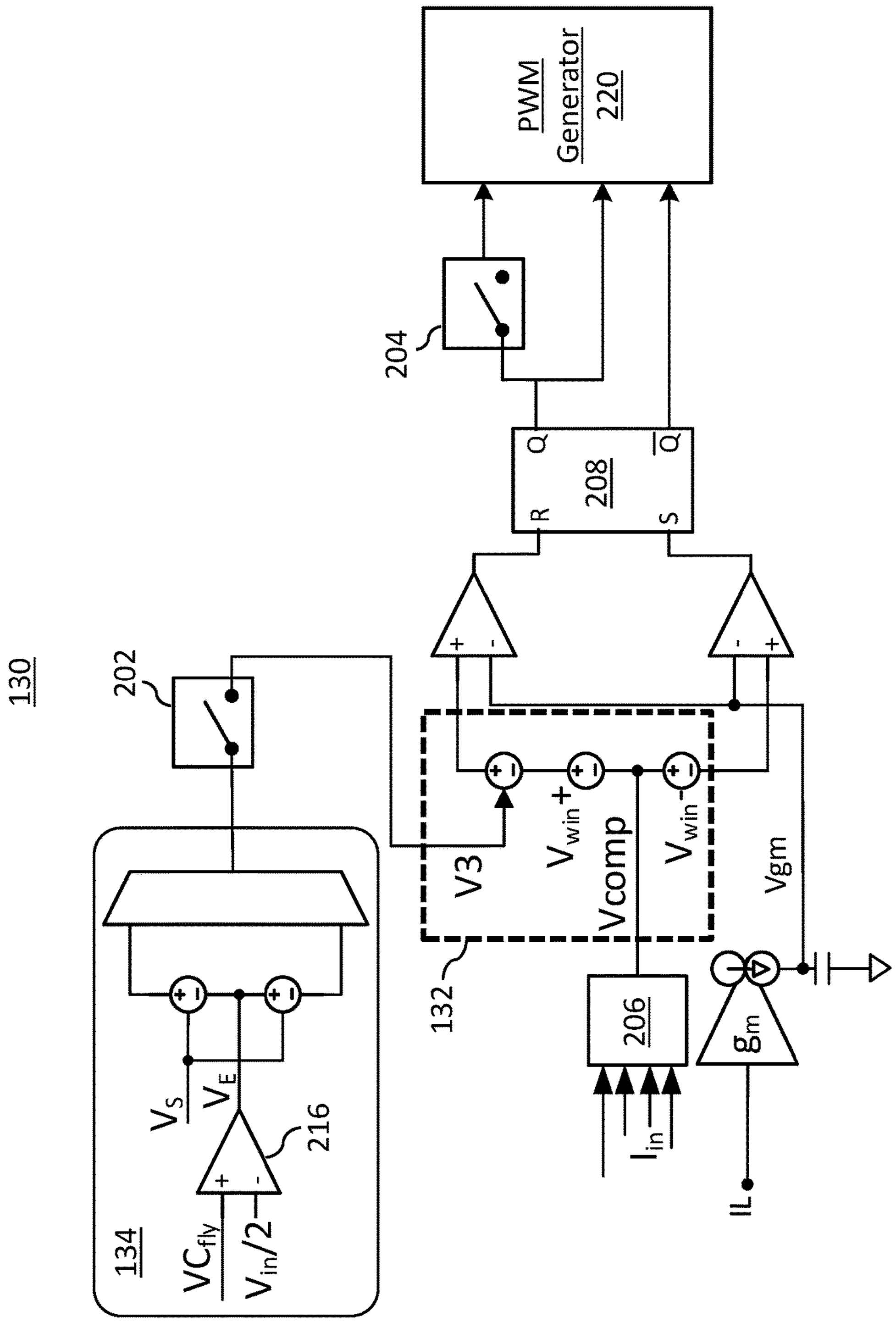
FIG. 2 is an example diagram showing details of a controller that can be used in configurable control for two-level and three-level buck converters in one embodiment.

FIG. 2 is an example diagram showing details of a controller that can be used in configurable control for two-level and three-level buck converters in one embodiment. Descriptions of FIG. 2 can reference components of FIG. 1. In an embodiment shown in FIG. 2, modulator 130 of controller 120 in FIG. 1 can include at least voltage window generator 132, Cfly balancer 134, a loop selector 206, a SR latch 208 and a PWM signal generator 220. Loop selector 206 can be a circuit configured to receive various parameters, such as input voltage Vin, output voltage Vout, inductor current through inductor L1 and switch node voltage from switching circuit 104, and generate a compensation signal Vcomp. Window generator 132 can use Vcomp to set a voltage window that has a range between an upper bound Vwin+ and a lower bound Vwin−. A current flowing across inductor L, labeled as IL, can be fed back to controller 120 and/or modulator 130 and a gain amplifier gm can convert IL into a voltage Vgm. SR latch 208 can be configured to control timings for PWM generator 220 to generate PWM signals such that there will not be multiple PWM signals within one PWM cycle. PWM generator 220 can be configured to generate PWM signals under specific sequences depending on whether switching circuit 104 is being programmed as a two-level buck converter or a three-level buck converter. Modulator 130 can attenuate the control signals generated by PWM generator 220 when Vgm reaches the upper bound Vwin+ of the voltage window and can increase or strengthen the control signals generated by PWM generator 220 when Vgm reaches the lower bound Vwin− of the voltage window.

In one embodiment, Cfly balancer 134 can be configured to generate a signal V3 having an offset voltage, where a duty cycle of signal V3 can be dependent on flying capacitor voltage VCfly. Hence, signal V3 can vary according to changes in VCfly. Cfly balancer 134 can include a comparator 216 that can determine a difference between VCfly and Vin/2, and output the difference as an error voltage VE. Cfly balancer 134 can generate signal V3 as a PWM signal having magnitude that varies between VE and a predefined scale voltage Vs, where scale voltage Vs can define a magnitude of signal V3. The scale voltage Vs can be fixed and error voltage VE can vary with VCfly.

As mentioned above, controller 120 can read the resistance value of $R_P$ and compare with the register values stored in registers 150, 152 to determine an operation mode of switching circuit 104. A first operation mode corresponding to register 150 can be to operate switching circuit 104 as a two-level buck converter. A second operation mode corresponding to register 152 can be to operate switching circuit 104 as a three-level buck converter. Controller 120 can receive $R_P$, read register 150, compare $R_P$ with the value read from register 150, and determine whether $R_P$ is the same as or different from the value read from register 150. Controller 120 can also receive $R_P$, read register 152, compare $R_P$ with the value read from register 152, and determine whether $R_P$ is the same as or different from the value read from register 152.

In response to $R_P$ being the same as the value read from register 152, controller 120 can operate switching circuit 104 as a three-level buck converter. To operate switching circuit 104 as a three-level buck converter, controller 120 can close or turn on a switch 202 to connect Cfly balancer 134 to voltage window generator 132 and close or turn on a switch 204 to connect SR latch 208 to PWM generator 220 using two signal paths from the Q output of SR latch 208. In response to connecting Cfly balancer 134 to window generator 132, Cfly balancer 134 can send V3 to window generator 132. The voltage V3 can be received and used by window generator 132 as an additional voltage source between Vwin+ and SR latch 208, such that the upper bound Vwin+ of the voltage window can be modified and the voltage window can be set to a range between Vwin− and the modified voltage level of Vwin+. In response to switches 202, 204 being turned on, PWM generator 220 can generate PWM signals PWM1, PWM2, PWM3, PWM4 under a sequence determined by the voltage window that was modified using offset voltage in signal V3. By way of example, if VCfly is greater than Vin/2, then the offset voltage in signal V3 can adjust Vwin+ by decreasing Vwin+ and PWM signals PWM1, PWM2, PWM3, PWM4 can discharge Cfly. If VCfly is less than Vin/2, then the offset voltage in signal V3 can adjust Vwin+ by increasing Vwin+ and PWM signals PWM1, PWM2, PWM3, PWM4 can charge Cfly.

In response to $R_P$ being the same as the value read from register 150, controller 120 can operate switching circuit 104 as a two-level buck converter. To operate switching circuit 104 as a two-level buck converter, controller 120 can open or turn off switch 202 to disconnect Cfly balancer 134 from voltage window generator 132 and open or turn off switch 204 to disconnect one of the two paths connecting the Q output of SR latch 208 to PWM generator 220. In response to switches 202, 204 being turned off, PWM generator 220 can generate PWM signals PWM1. PWM2 based on the voltage window that has the range between Vwin− and Vwin+. In one embodiment, in response to switches 202, 204 being turned off, PWM generator 220 can further generate PWM3, PWM4 as a constantly high voltage signal to maintain Q3, Q4 in an ON state such that Vin can be provided to Q2.

Figure 3:
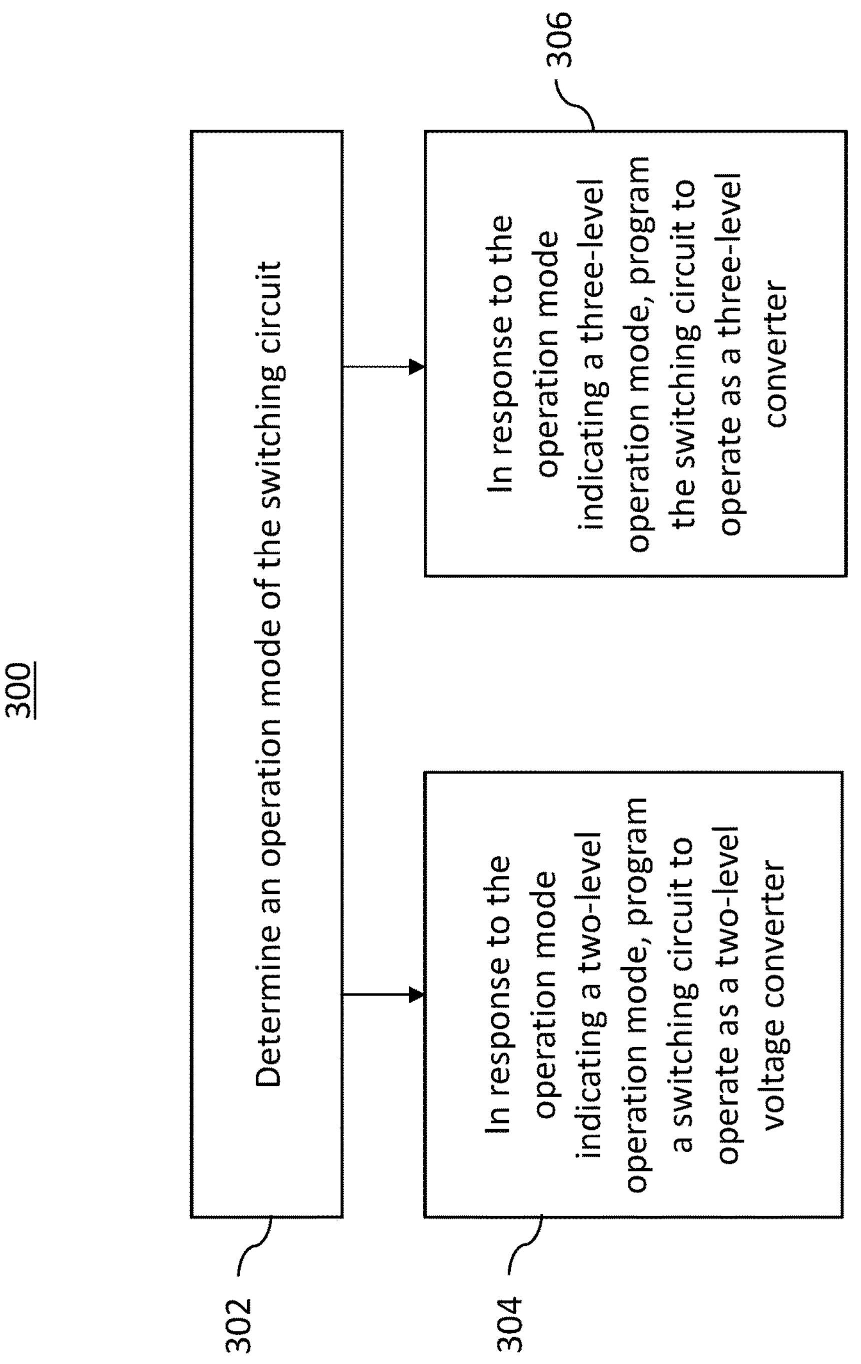
FIG. 3 is a flow diagram illustrating a process to implement configurable control for two-level and three-level buck converters in one embodiment.

FIG. 3 is a flow diagram illustrating a process to implement configurable control for two-level and three-level buck converters in one embodiment. The process can include one or more operations, actions, or functions as illustrated by one or more of blocks 302, 304, and/or 306. Although illustrated as discrete blocks, various blocks can be divided into additional blocks, combined into fewer blocks, eliminated, performed in different order, or performed in parallel, depending on the desired implementation.

Process 300 can be performed by controller 120 described herein. Process 300 can begin at block 302. At block 302, the controller can determine an operation mode of a switching circuit. In one embodiment, the controller can obtain a resistance value from an input pin of the controller. The controller can further read a register value to determine the operation mode. The controller can further compare the resistance value with the register value to determine the operation mode. In one embodiment, the two-level voltage converter can be a two-level buck converter and the three-level voltage converter can be a three-level buck converter.

Process 300 can proceed from block 302 to block 304. At block 304, the controller can, in response to the operation mode indicating a two-level operation mode, program a switching circuit to operate as a two-level voltage converter. Process 300 can proceed from block 302 to block 306. At block 306, the controller can, in response to the operation mode indicating a three-level operation mode, program the switching circuit to operate as a three-level converter.

In one embodiment, the controller can, in response to the operation mode indicating the two-level operation mode, operate a modulator to generate a first set of control signals to operate a part or a subset of the plurality of switching elements in the switching circuit under a first switching sequence. The controller can further, in response to the operation mode indicating the three-level operation mode, operate the modulator to generate a second set of control signals to operate the plurality of switching elements in the switching circuit under a second switching sequence.

In one embodiment, the controller can, in response to the operation mode indicating the three-level operation mode, activate a flying capacitor balancer to control a flying capacitor voltage of a flying capacitor connected to the switching circuit.

In one embodiment, the controller can, in response to the operation mode indicating the two-level operation mode, disconnect a flying capacitor balancer from a voltage window generator. The flying capacitor balancer can be configured to generate an offset voltage based on a voltage of a flying capacitor voltage connected to the switching circuit. The voltage window generator can be configured to set a voltage window that controls a plurality of controls signals for operating the switching converter. The controller can further, in response to the operation mode indicating the three-level operation mode, connect the flying capacitor balancer to the voltage window generator to use the offset voltage to modify the voltage window. In one embodiment, the controller, the flying capacitor balancer and the voltage window are monolithically integrated in a single die.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:
- a switching circuit including a plurality of switching elements; and
- a controller configured to:
  - obtain a resistance value from an input pin of the controller;
  - read a register value;
  - compare the resistance value with the register value to determine an operation mode of the switching circuit;
  - in response to the operation mode indicating a two-level operation mode, program the switching circuit to operate as a two-level voltage converter; and
  - in response to the operation mode indicating a three-level operation mode, program the switching circuit to operate as a three-level voltage converter.

2. The semiconductor device of claim 1, wherein the controller is configured to:
- in response to the operation mode indicating the two-level operation mode, operate a modulator to generate a first set of control signals to operate a subset of the plurality of switching elements in the switching circuit under a first switching sequence; and in response to the operation mode indicating the three-level operation mode, operate the modulator to generate a second set of control signals to operate the plurality of switching elements in the switching circuit under a second switching sequence.

3. The semiconductor device of claim 1, further comprising:

a flying capacitor connected to the switching circuit; and a flying capacitor balancer, wherein the controller is configured to, in response to the operation mode indicating the three-level operation mode, activate the flying capacitor balancer to control a flying capacitor voltage of the flying capacitor.

4. The semiconductor device of claim 1, further comprising:

a flying capacitor balancer configured to generate an offset voltage based on a voltage of a flying capacitor voltage connected to the switching circuit; and a voltage window generator configured to set a voltage window that controls a plurality of controls signals for operating the switching circuit, wherein the controller is configured to:

in response to the operation mode indicating the two-level operation mode, disconnect the flying capacitor balancer from the voltage window generator; and in response to the operation mode indicating the three-level operation mode, connect the flying capacitor balancer to the voltage window generator to use the offset voltage to modify the voltage window.

5. The semiconductor device of claim 1, further comprising:

a flying capacitor balancer configured to generate an offset voltage based on a voltage of a flying capacitor voltage connected to the switching circuit; and a voltage window generator configured to:

in response to the operation mode indicating the two-level operation mode, set a voltage window to a first range including an upper bound and a lower bound; and in response to the operation mode indicating the three-level operation mode, set the voltage window to a second range including a modified upper bound and the lower bound, wherein the modified upper bound is dependent on the offset voltage.

6. The semiconductor device of claim 5, wherein the controller, the flying capacitor balancer and the voltage window are monolithically integrated in a single die.

7. The semiconductor device of claim 1, wherein the two-level voltage converter is a two-level buck converter, and wherein the three-level voltage converter is a three-level buck converter.

8. A semiconductor device comprising:

a modulator configured to generate a plurality of control signals to operate a switching circuit;

a flying capacitor balancer configured to control a flying capacitor voltage of a flying capacitor connected to the switching circuit; and a controller configured to:

obtain a resistance value from an input pin of the controller;

read a register value;

compare the resistance value with the register value to determine an operation mode of the switching circuit;

in response to the operation mode indicating a two-level operation mode, program the modulator to generate a first set of control signals for operating the switching circuit as a two-level voltage converter; and in response to the operation mode indicating a three-level operation mode:

connect the flying capacitor balancer to the modulator to control the flying capacitor voltage of the flying capacitor; and program the modulator to generate a second set of control signals for operating the switching circuit as a three-level voltage converter.

9. The semiconductor device of claim 8, wherein the controller is configured to:

in response to the operation mode indicating the two-level operation mode, operate the modulator to generate the first set of control signals to operate a subset of a plurality of switching elements in the switching circuit under a first switching sequence; and in response to the operation mode indicating the three-level operation mode, operate the modulator to generate the second set of control signals to operate the plurality of switching elements in the switching circuit under a second switching sequence.

10. The semiconductor device of claim 8, wherein the flying capacitor balancer is configured to generate an offset voltage based on the flying capacitor voltage, and wherein the modulator comprises a voltage window generator configured to:

in response to the operation mode indicating the two-level operation mode, set a voltage window to a first range including an upper bound and a lower bound; and in response to the operation mode indicating the three-level operation mode, set the voltage window to a second range including a modified upper bound and the lower bound, wherein the modified upper bound is dependent on the offset voltage.

11. The semiconductor device of claim 10, wherein the modulator, the controller and the flying capacitor balancer are monolithically integrated in a single die.

12. The semiconductor device of claim 8, wherein the two-level voltage converter is a two-level buck converter, and wherein the three-level voltage converter is a three-level buck converter.

13. A method for programming a voltage converter, the method comprising:

obtaining a resistance value from an input pin;

reading a register value;

comparing the resistance value with the register value to determine an operation mode of a switching circuit;

determining the operation mode of the switching circuit indicates a two-level operation mode;

in response to the operation mode indicating the two-level operation mode, programming the switching circuit to operate as a two-level voltage converter;

determining the operation mode of the switching circuit indicates a three-level operation mode; and in response to the operation mode indicating the three-level operation mode, programming the switching circuit to operate as a three-level voltage converter.

14. The method of claim 13, wherein the two-level voltage converter is a two-level buck converter, and wherein the three-level voltage converter is a three-level buck converter.

15. The method of claim 13, further comprising:

in response to the operation mode indicating the two-level operation mode, operating a modulator to generate a first set of control signals to operate a subset of a plurality of switching elements in the switching circuit under a first switching sequence; and in response to the operation mode indicating the three-level operation mode, operate the modulator to generate a second set of control signals to operate the plurality of switching elements in the switching circuit under a second switching sequence.

16. The method of claim 13, further comprising:

in response to the operation mode indicating the three-level operation mode, activating a flying capacitor balancer to control a flying capacitor voltage of a flying capacitor connected to the switching circuit.

17. The method of claim 13, further comprising:

in response to the operation mode indicating the two-level operation mode, disconnecting a flying capacitor balancer from a voltage window generator, wherein disconnecting the flying capacitor balancer from the voltage window generator causes the voltage window generator configured to set a first voltage window that controls a plurality of controls signals for operating the switching circuit as the two-level voltage converter; and in response to the operation mode indicating the three-level operation mode, connecting the flying capacitor balancer to the voltage window generator, wherein connecting the flying capacitor balancer to the voltage window generator causes the voltage window generator to set a second voltage window that controls the plurality of controls signals for operating the switching circuit as the three-level voltage converter.

* * * * *